(12) United States Patent
Miernik et al.

(10) Patent No.: US 7,369,564 B1
(45) Date of Patent: May 6, 2008

(54) METHOD AND SYSTEM FOR SERVICE FLOW MOBILITY IN A WIRELESS NETWORK

(75) Inventors: Jerzy Miernik, Allen, TX (US); Daotang Yang, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 1092 days.

(21) Appl. No.: 09/895,993

(22) Filed: Jun. 29, 2001

(51) Int. Cl.
*H04L 12/56* (2006.01)

(52) U.S. Cl. .................. 370/412; 370/331; 455/436

(58) Field of Classification Search ........... 370/412, 370/414, 428, 429, 413, 415, 417
See application file for complete search history.

(56) References Cited

U.S. PATENT DOCUMENTS

| | | | | |
|---|---|---|---|---|
| 6,097,700 A | * | 8/2000 | Thornberg et al. | 370/233 |
| 6,111,863 A | * | 8/2000 | Rostoker et al. | 370/329 |
| 6,192,039 B1 | * | 2/2001 | Nishio et al. | 370/331 |
| 6,385,451 B1 | * | 5/2002 | Kalliokulju et al. | 455/437 |
| 6,609,002 B1 | * | 8/2003 | Krishnamurthy et al. | 455/428 |
| 6,611,547 B1 | * | 8/2003 | Rauhala | 370/331 |
| 6,647,265 B1 | * | 11/2003 | Olofsson et al. | 455/445 |
| 6,865,185 B1 | * | 3/2005 | Patel et al. | 370/412 |
| 6,907,243 B1 | * | 6/2005 | Patel | 455/442 |
| 6,910,074 B1 | * | 6/2005 | Amin et al. | 709/227 |
| 6,928,304 B2 | * | 8/2005 | Wigell et al. | 455/561 |
| 6,999,436 B2 | * | 2/2006 | Zheng et al. | 370/331 |
| 7,016,678 B1 | * | 3/2006 | Kalliokulju et al. | 455/436 |
| 7,068,624 B1 | * | 6/2006 | Dantu et al. | 370/331 |
| 2002/0099854 A1 | * | 7/2002 | Jorgensen | 709/249 |
| 2002/0131434 A1 | * | 9/2002 | Vukovic et al. | 370/411 |
| 2002/0147834 A1 | * | 10/2002 | Liou et al. | 709/236 |
| 2002/0176382 A1 | * | 11/2002 | Madour et al. | 370/331 |
| 2004/0174865 A1 | * | 9/2004 | O'Neill | 370/352 |
| 2004/0248583 A1 | * | 12/2004 | Satt et al. | 455/452.2 |

OTHER PUBLICATIONS

Balakrishnan et al., "Improving reliable transport and handoff performance in cellular wireless networks," *Wireless Networks 1*, 1995, pp. 469-481.
Cohen et al., "Handover in a micro-cell packet switched mobile network," *Wireless Networks 2*, 1996, pp. 13-25.
U.S. Appl. No. 09/513,912, entitled "Method and System for Queuing Traffic in a Wireless Communications Network," filed Feb. 25, 2000, 83 total pages.

(Continued)

*Primary Examiner*—Chi Pham
*Assistant Examiner*—Kevin Mew
(74) *Attorney, Agent, or Firm*—Baker Botts L.L.P.

(57) ABSTRACT

Traffic for a mobile device is queued in one of a plurality of class of service queues for the mobile device. An association of the class of service queues for the mobile device is altered from a first sector to a second sector in response to at least a sector change for the mobile device. Post-sector-change packets for the mobile device are held until pre-sector-change packets have been emptied from the class of service queues.

45 Claims, 3 Drawing Sheets

OTHER PUBLICATIONS

U.S. Appl. No. 09/513,913, entitled "Method and System for Managing Transmission Resources in a Wireless Communications Network," filed Feb. 25, 2000, 64 total pages.

U.S. Appl. No. 09/513,592, entitled "Method and System for Brokering Bandwidth in a Wireless Communications Network," filed Feb. 25, 2000, 50 total pages.

U.S. Appl. No. 09/513,914, entitled "Wireless Router and Method for Processing Traffic in a Wireless Communications Network," filed Feb. 25, 2000, 74 total pages.

U.S. Appl. No. 09/513,090, entitled "Method and System for Configuring Wireless Routers and Networks," filed Feb. 25, 2000, 79 total pages.

* cited by examiner

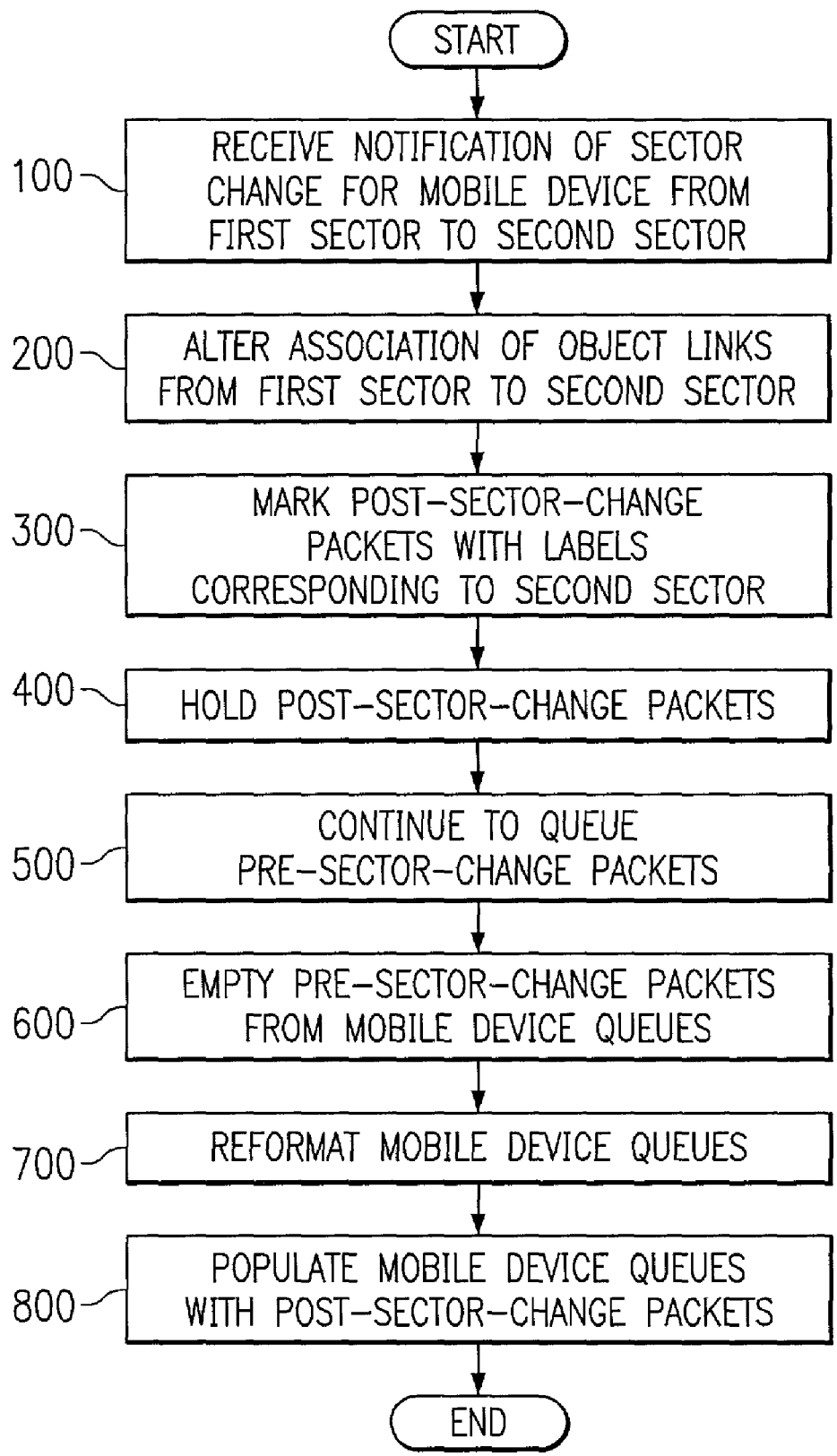

METHOD AND SYSTEM FOR SERVICE FLOW MOBILITY IN A WIRELESS NETWORK

TECHNICAL FIELD OF THE INVENTION

This invention relates in general to the field of wireless communications, and more particularly to a method and system for service flow mobility in a wireless network.

BACKGROUND OF THE INVENTION

Wireline and wireless Internet protocol (IP) networks have traditionally supported a best effort delivery of all traffic. To support enhanced services, multiple types, or classes, of services have been established and assigned certain quality of service (QoS) parameters that manage queues for each service type. The QoS parameters include delay, jitter, error rates, and throughput. The QoS parameters can be provisioned on a per IP connection or per flow basis through mechanisms such as resource reservation protocol (RSVP) or can be provisioned on aggregate flows which are classified into service classes. Internet service providers (ISPs) can utilize the service classes, their associated QoS behavior and QoS provisioning to provide tiered service offerings to their business and consumer customers.

The IP QoS architecture provides tools for marking IP flows, controlling and shaping the traffic of various IP flows, and managing various IP queues in each sector in order to ensure QoS behavior for each class of service. Queue management algorithms include head-drop, tail-drop, first in first out (FIFO) and random early detect (RED). The queue management in a sector may be on individual microflows or on aggregate flows which are treated with similar QoS behavior.

As mobile devices move across sectors, packets for the devices are requeued and redirected to the current sector, which can cause out of order delivery, packet drops, and other problems.

SUMMARY OF THE INVENTION

The present invention provides a method and system for service flow mobility in a wireless network that substantially reduces or eliminates problems and disadvantages with previous systems and methods. In accordance with the present invention, as a mobile device moves to a new sector, newly arriving data packets for the devices are held while previously queued packets for the device are emptied.

In accordance with one embodiment of the present invention, the method comprises queuing traffic for a mobile device in one of a plurality of class service queues for the mobile device, altering an association of the class of service queues for the mobile device from a first sector to a second sector in response to at least a sector change for the mobile device, and holding post sector change packets for the mobile device until pre-sector change packets have been emptied from the class of service queues.

Buffering of packets destined to the mobile device in the second sector is needed since there can also be packets in transmission in the network destined to mobile device in the first sector. The packets destined to mobile device in the first sector could have been delayed so as to arrive later than packets destined for mobile device in the second sector. Such late packet arrival may also be possible due to a class change of a flow dependent on the location of mobile, such a class change requiring different queueing procedures.

Technical advantages of the present invention include maintaining packet order for handoffs for wireless sectors. In a particular embodiment, no limitation is imposed on the velocity and direction of the mobile station movements. In addition, no limitation is imposed on the number of service flows being delivered to the mobile station. Various embodiments of the present invention may provide some, all or none of these technical advantages.

Other technical advantages of the present invention will be readily apparent to one skilled in the art from the following figures, description and claims.

BRIEF DESCRIPTION OF THE DRAWINGS

For a more complete understanding of the present invention and its advantages, reference is now made to the following description, taken in conjunction with the accompanying drawings, in which:

FIG. 3 is a flow diagram illustrating a method for service flow mobility in accordance with one embodiment of the present invention.

DETAILED DESCRIPTION OF THE INVENTION

Figure 1:
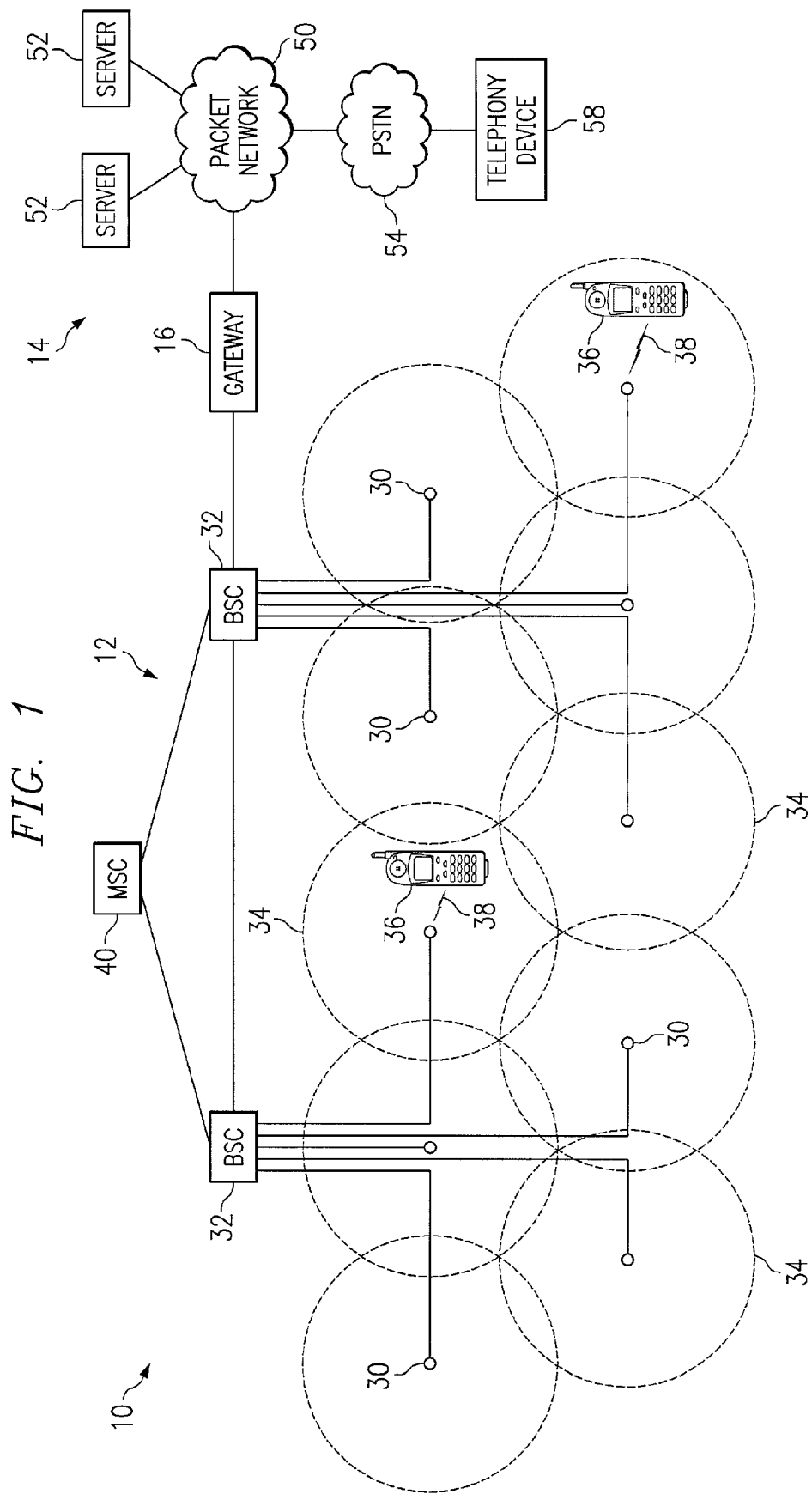
FIG. 1 is a block diagram illustrating a communications network in accordance with one embodiment of the present invention.

FIG. 1 illustrates a communications system 10 in accordance with one embodiment of the present invention. In this embodiment, the communications system 10 includes a cellular wireless network in which terrestrial wireless transmissions originate in geographically delimited sectors. A sector may comprise one cell, many cells, or a portion of a cell. It will be understood that the present invention may be used in connection with other suitable wireless networks.

Referring to FIG. 1, the communications system 10 includes a wireless network 12 connected to a wireline network 14 through a gateway 16. In one embodiment, the gateway may be a packet data serving node (PDSN). The gateway 16 comprises a router that directs traffic between the wireless and wireline networks 12 and 14. It will be understood that connectivity between the wireline and wireless networks 12 and 14 may be otherwise suitably provided without departing from the scope of the present invention.

The wireless network 12 includes a number of base stations (BTSs) 30 connected to base station controllers (BSCs) 32. The BTSs 30 each cover a geographic region or sector 34 of the wireless network 12 and communicate with mobile devices 36 in the sector 34. The mobile devices 36 may be cell phones, data phones, portable data devices, portable computers, handheld devices, handsets, portable network appliances or other suitable devices capable of communicating information over a wireless link 38.

The BSCs 32 are connected to each other, to the gateway 16 and to a mobile switching center (MSC) 40. The BSCs 32 and the MSC 40 provide switch and soft handoff functionality for the wireless network 12. In this way, voice, video, data and other information is routed to and from the mobile devices 36 and connections are maintained with the mobile devices 36 as they move throughout, or roam the wireless network 12.

Wireless link 38 is a radio frequency (RF) link. The wireless link 38 may be based on established technologies or standards such as IS-54 (TDMA), IS-95 (CDMA), GSM and AMPS, 802.11 based WLAN, or more recent technology such as CDMA 2000 and W-CDMA or proprietary radio interfaces. In a particular embodiment, wireless link 38 comprises a code division multiple access (CDMA) link based on a CDMA standard and in which packets are segmented into radio frames for transmission over the wireless interface and reassembled by the receiving device to reconstitute the packets.

The wireline network 14 includes a packet or other suitable data network 50 connecting a number of servers 52 to each other. The packet network 50 also connects to the public switched telephone network (PSTN) 54. Accordingly, mobile devices 36 may communicate through wireless network 12, packet network 50 and PSTN 54 with standard telephones, clients and computers using modems or digital subscriber line (DSL) connections or other telephony devices 58.

The data network 50 may be the Internet, intranet, extranet, or other suitable local or wide area network capable of communicating information between remote endpoints. For the Internet embodiment, information is transmitted in Internet protocol (IP) packets. It will be understood that information may be transmitted in other suitable packets, including asynchronous transport mode (ATM) and other cells or datagrams.

The servers 52 may comprise voicemail servers (VMS), fax/modem servers, short message center (SMSC) servers, conferencing facilities, authentication, authorization, and accounting (AAA) servers, billing servers, home location registers (HLR), home subscriber servers (HSS), domain name servers (DNS) and other suitable servers and functionality providing services to mobile devices 36 and/or to wireless and/or wireline connections in the communications system 10.

The servers 52 and/or other elements of the wireless or wireline networks 12 and 14 store subscriber level information for users of the wireless and/or wireline networks 12 and 14. The service level information includes service, quality and/or service level agreement (SLA) parameters for user connections as well as rate and other subscription information. In a particular embodiment, the BSCs 32 and/or gateway 16 store or access service level agreement (SLA) databases including class of service parameters and other information for each user. The class of service parameters may include drops, delay, jitter, rate and other limits of information for the user connections, which may include defined Class of Service (CoS) and/or Quality of Service (QoS) parameters. It will be understood that subscription level information may be otherwise stored and/or accessed for call set up and mobility processing by the communications network 10.

Figure 2:
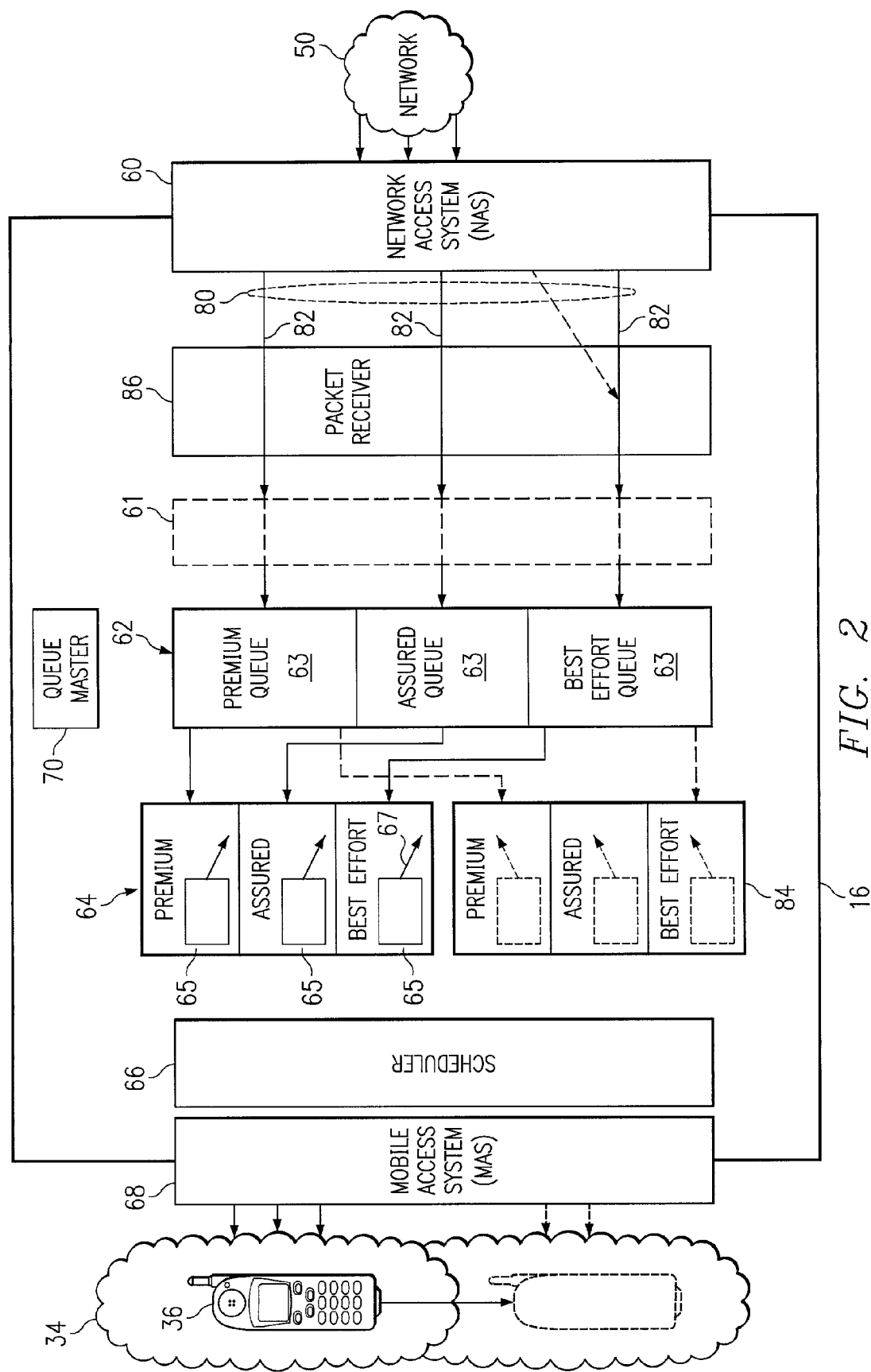
FIG. 2 is a block diagram illustrating details of the data gateway of FIG. 1 in accordance with one embodiment of the present invention.

FIG. 2 illustrates details of the gateway 16 in accordance with one embodiment of the present invention. In this embodiment, independent class of service queues are used for each mobile device 36. It will be understood that traffic may be otherwise suitable queued without departing from the scope of the present invention.

Referring now to FIG. 2, the data gateway 16 comprises a network access system (NAS) 60, a queue set 62 for each mobile device 36, a set of object links 64 for each sector 34, a scheduler 66, a mobile access system (MAS) 68, a queue master 70, and a packet receiver 86. The queue master 70 comprises logic encoded in or on a computer-readable media for implementing packet flow control and other suitable functionality of the system. The logic may comprise software stored on the computer-readable medium, or hardware encoded in a processor card, application specific integrated circuits (ASIC), field programmable gate arrays (FPGA) and the like. The software includes programs, modules, functions, database tables and entries, data, routines, data storage, and other suitable elements.

The network access system 60 is communicably connected to the network 50. The network access system 60 receives packets from the network 50, processes the packets and forwards the packets to the packet receiver 86 which forwards the packets to the appropriate queue set 62. In one embodiment, the NAS 60 labels each packet for routing in the wireless network 12, using MPLS or other suitable labels. As used herein, the term each means every one of at least a subset of the identified items.

The queue sets 62 include separate class of service queues 63 for packets of the corresponding mobile device. The queue sets 62 are set up as part of call processing set up. In a particular embodiment, the queue set 62 would comprise premium (such as expedited forwarding (EF)), assured forwarding (AF), and best effort (BE) queues. The queues 63 are added or deleted when application using the corresponding queues 63 are activated or terminated. The queues 63 may be any memory, buffer or storage operable to receive and hold packets for processing.

The link objects 64 associate the queue sets 62 with particular sector 34. In one embodiment, the link object sets 64 are subdivided into various classes of service link sets 65 supported by the corresponding sector 34. In this embodiment, each 65 has pointers 67 which are used by the scheduler to identify and/or retrieve packets for each sector 34.

The scheduler 66 controls the timing of packet transmittal on a per sector 34 basis. The scheduler 66 may also perform other packet processing functions. The scheduler 66 respects packet flow time-to-send and sector time-to-send.

The mobile access system (MAS) 68 communicates with the BSC 32 or other elements of the network 12 to track the location, and changes thereof, of the mobile devices 36. The MAS 68 also transmits packets received from the scheduler to the corresponding sector 34.

The queue master 70 creates and manages the queue sets 62 and object links 67 in object link sets 64. The queue master 70 ensures compliance, controls congestion, and manages drops. In accordance with a particular embodiment of the present invention, the queue master 70 may comprise a computer program executing on a processor card.

In operation, packets from the packet network 50 are labeled by the NAS 60 and divided into device flows 80 based on MPLS labels. Each flow 80 includes one or more subflows or microflows 82 corresponding to one class of service parameters.

Packets are forwarded to set of queues 62 by the packet receiver 86 and placed in corresponding queues 63. The packets are pulled by the scheduler 66 through the object link set 64 to the MAS 68 to the mobile device 36. As the mobile device 36 moves, it is tracked by the BSC 32. When such a move occurs, the MAS 68 receives an end-of-handoff signal, and the MAS 68 in turn transmits the end-of-handoff message to the NAS 60. A signal message indicating the move is then sent by NAS 60 to the queuemaster 70. In a particular embodiment, the message from the NAS 60 to the queuemaster 70 further comprises instructions to create a buffer 61. The NAS 60 marks incoming packets received after the sector change and/or sector change notification, i.e., "post-sector-change packets," with labels corresponding to the second sector. However, "pre-sector-change packets," i.e., packets already arrived from the network at and/or before the time of the sector change and/or the sector change notification, may still need to be emptied from the queues and transmitted without disrupting packet order.

To handle a sector change, the queue master 70 generates a buffer 61 to "hold" post-sector-change packets, i.e., temporarily prevent post-sector-change packets from being transmitted, queued for transmission and/or queued for transmission related processing. Pre-sector-change packets continue to be transmitted or dropped until they are drained from the queues.

The gateway may be operable to hold or buffer post-sector change packets accruing from any number of sector-changes, prior to the transmittal of pre-sector change packets. This may be accomplished by creating a new buffer or sub-buffer for each sector change.

In case a packet has been delayed within gateway 16 due to traffic conditioning in NAS 60 while the mobile device was still in the first sector or in handoff, the packet receiver 86 to let such a packet to bypass buffer 61 and be queued in queue 63 corresponding to the packet class of service.

Additional or fewer classes of service may be available in the new sector. Once pre-sector-change packets are emptied from the queues, the queue master 70 is operable to reformat the set of queues 62 for compatibility with the classes of service available in the new sector. Upon the completion of reformatting, the link objects 65 associated with the mobile device 36 are deleted from the object link list associated with the first sector and a new set of object links 84 associated with the mobile device 36 are created in the object link list associated with the second sector. Post-sector-change packets are then released from the buffer, queued in the appropriate CoS queue, and transmitted to the mobile device 36.

The buffer 61 or other suitable elements may keep track of the number of packets transmitted to the old sector, per handoff and per flow. The number of outstanding handoffs may also be tracked.

FIG. 3 illustrates a method for service flow mobility in a wireless network in accordance with one embodiment of the present invention. The method begins at step 100 in which the MAS 68 receives a notification of the sector change from a first sector to a second sector. In step 200, the object links 65 associated with the mobile device 36 are deleted from the object link list associated with the first sector and a new set of object links associated with the mobile device 36 are created in the object link list 84 associated with the second sector. As described, the links have pointers which point the scheduler to the appropriate queues for retrieving packets.

In step 300, the NAS 60 is informed of the sector change by the MAS 68 and the NAS 60 marks incoming packets that are destined for the second sector with labels corresponding to the second sector. In one embodiment, the labels may be MPLS labels.

Proceeding to step 400, post-sector-change packets are temporarily held in a buffer. In one embodiment, the packets are held by directing all packets with an MPLS corresponding to the new sector to the buffer. At step 500, pre-sector-change packets, including "late" packets delayed in the NAS 60, continue to be received and queued. At step 600, pre-sector-change packets continue to be transmitted, dropped or otherwise emptied from the queue until the queue is empty.

Proceeding to step 700, when the queue set is emptied of pre-sector-change packets, the queue set is reformatted if necessary due to a differential in the available services between the first and second sector. In one embodiment, a new queue or queues may be set up for a call with additional classes of service available. If due to a sector change a queue is no longer needed, it may not be deleted but may be left unused.

In step 800, the queue set 62 is populated with post-sector-change packets, and transmission of post-sector-change packets to the mobile device 36 proceeds.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for service flow mobility, comprising:
   queuing traffic for a mobile device in one of a plurality of class of service queues in a gateway for the mobile device;
   altering an association of the class of service queues for the mobile device from a first sector to a second sector in response to at least a sector change for the mobile device, wherein altering an association of the class of service queues for the mobile device from a first sector to a second sector comprises:
      deleting an object link corresponding to the mobile device from a first sector object list in the gateway; and
      creating an object link corresponding to the mobile device in a second sector object list in the gateway; and
   holding post-sector-change packets for the mobile device temporarily in a buffer in the gateway until pre-sector-change packets have been emptied from the class of service queues in the gateway.

2. The method of claim 1, further comprising reformatting the class of service queues by altering a type of class of service queues for the mobile device based on admission criteria of the second sector.

3. The method of claim 2, wherein the admission criteria comprises classes of service available in the second sector.

4. The method of claim 2, further comprising after reformatting the class of service queues, placing the held post-sector-change packets in the class of service queues.

5. The method of claim 1, wherein the post-sector-change packets are identified by a label.

6. The method of claim 1, wherein the sector change comprises a primary sector change.

7. The method of claim 6, further comprising scheduling traffic out of the class of service queues for delivery to the mobile device through a corresponding class of service of the primary sector for the mobile device.

8. The method of claim 1, wherein the pre-sector-change packets comprise packets that have already been queued at a time of the sector change.

9. The method of claim 1, wherein packet labels are used to identify pre-sector-change packets and post-sector-change packets.

10. The method of claim 1, further comprising in response to at least a further sector change, prior to emptying the pre-sector-change packets from the class of service queues, holding further post-sector-change packets for the mobile device until the pre-sector-change and the post-sector-change packets have been emptied from the class of service queues.

11. A system for service flow mobility, comprising:
  means for queuing traffic for a mobile device in one of a plurality of class of service queues in a gateway for the mobile device;
  means for altering an association of the class of service queues for the mobile device from a first sector to a second sector in response to at least a sector change for the mobile device, wherein means for altering an association of the class of service queues for the mobile device from a first sector to a second sector comprises:
    means for deleting an object link corresponding to the mobile device from a first sector object list in the gateway; and
    means for creating an object link corresponding to the mobile device in a second sector object list in the gateway; and
  means for holding post-sector-change packets for the mobile device temporarily in a buffer in the gateway until pre-sector-change packets have been emptied from the class of service queues in the gateway.

12. The system of claim 11, further comprising means for after emptying the class of service queues reformatting the class of service queues by altering a type of class of service queues for the mobile device based on admission criteria of the second sector.

13. The system of claim 12, wherein the admission criteria comprises classes of service available in the second sector.

14. The system of claim 12, further comprising means for after reformatting the class of service queues, placing the held post-sector-change packets in the class of service queues.

15. The system of claim 11, wherein a destination of the packets is identified using labels.

16. The system of claim 11, wherein the sector change comprises a primary sector change.

17. The system of claim 16, further comprising means for scheduling traffic out of the class of service queues for delivery to the mobile device through a corresponding class of service of the primary sector for the mobile device.

18. The system of claim 11, wherein the pre-sector-change packets comprise packets that have already been queued at a time of the sector change.

19. The system of claim 11, wherein labels are used to identify pre-sector-change packets and post-sector-change packets.

20. The system of claim 11, further comprising means to, in response to at least a further sector change, prior to emptying the pre-sector-change packets from the class of service queues, holding further post-sector-change packets for the mobile device until the pre-sector-change and the post-sector-change packets have been emptied from the class of service queues.

21. A system for service flow mobility comprising logic encoded in media, the logic operable to:
  queue traffic for a mobile device in one of a plurality of class of service queues in a gateway for the mobile device;
  alter an association of the class of service queues for the mobile device from a first sector to a second sector in response to at least a sector change for the mobile device, wherein altering an association of the class of service queues for the mobile device from a first sector to a second sector comprises:
    deleting an object link corresponding to the mobile device from a first sector object list in the gateway, and
    creating an object link corresponding to the mobile device in a second sector object list in the gateway; and
  hold post-sector-change packets for the mobile device temporarily in a buffer in the gateway until pre-sector-change packets have been emptied from the class of service queues in the gateway.

22. The system of claim 21, further comprising logic operable to, after emptying the class of service queues, reformat the class of service queues by altering a type of class of service queues for the mobile device based on admission criteria of the second sector.

23. The system of claim 22, wherein the admission criteria comprises classes of service available in the second sector.

24. The system of claim 22, further comprising after reformatting the class of service queues, logic operable to place the held post-sector-change packets in the class of service queues.

25. The system of claim 21, wherein a destination of the packets is identified using labels.

26. The system of claim 21, wherein the sector change comprises a primary sector change.

27. The system of claim 26, further comprising logic operable to schedule traffic out of the class of service queues for delivery to the mobile device through a corresponding class of service of the primary sector for the mobile device.

28. The system of claim 21, wherein the pre-sector-change packets comprise packets that have already been queued at a time of the sector change.

29. The system of claim 21, wherein labels are used to identify pre-sector-change packets and post-sector-change packets.

30. The system of claim 21, further comprising logic operable to, in response to at least a further sector change, prior to emptying the pre-sector-change packets from the class of service queues, hold further post-sector-change packets for the mobile device until the pre-sector-change and the post-sector-change packets have been emptied from the class of service queues.

31. A method for service flow mobility that maintains packet order comprising:
  receiving at a gateway sending data to a mobile device a sector change notification indicating that a primary sector of the mobile device has changed from a first sector to a second sector;
  generating labels for incoming data packets destined for the mobile device received after the sector change notification, the labels associated with the second sector;
  applying the labels to the incoming data packets;
  buffering the incoming data packets in a buffer list;
  deleting object links corresponding to the mobile device from a first sector-specific object list in the gateway, wherein the first sector-specific object list corresponds to the first sector;
  creating object links corresponding to the mobile device in a second sector-specific object list in the gateway, wherein the second sector-specific object list corresponds to the second primary sector; and
  queuing data packets from the buffer list when an existing queue of data packets destined for the mobile device have been transmitted.

32. The method of claim 31, wherein the flow of the data packets is divided into a plurality of microflows.

33. The method of claim 32, wherein the microflows correspond to classes of service.

34. The method of claim 31, wherein data packets are queued according to class of service.

35. The method of claim 34, wherein the existing queue of data packets corresponds to the classes of service available in the first sector.

36. The method of claim 34, wherein the queuing of data packets from the buffer list corresponds to the classes of service available in the second sector.

37. The method of claim 31, further comprising, in response to at least a further section change, prior to emptying the pre-sector change packets for the class of service queues, holding further post-sector change packets for the mobile device until the pre-sector change and the post-sector change packets have been emptied from the class of service queues.

38. A system for service flow mobility that maintains packet order comprising:
   means for receiving at a gateway sending data to a mobile device a notification that a primary sector of the mobile device has changed;
   means for deleting object links corresponding to the mobile device from a sector-specific object list in the gateway, wherein the sector-specific object list corresponds to an old primary sector;
   means for creating object links corresponding to the mobile device in another sector-specific object list in the gateway, wherein the other sector-specific object list corresponds to a new primary sector;
   means for changing labels of incoming data packets destined for the mobile device;
   means for buffering the incoming data packets in a buffer list;
   means for queuing and transmitting data packets from the buffer list when an existing queue of data packets destined for the mobile device have been transmitted.

39. The system of claim 38, wherein the flow of the data packets is divided into a plurality of microflows.

40. The system of claim 39, wherein the microflows correspond to classes of service.

41. The system of claim 38, wherein data packets are queued according to class of service.

42. The system of claim 41, wherein the existing queue of data packets corresponds to the classes of service available in the old sector.

43. The system of claim 41, wherein the queuing of data packets from the buffer list corresponds to the classes of service available in the new sector.

44. The system of claim 38, further comprising means to, in response to at least a further section change, prior to emptying the pre-sector change packets for the class of service queues, holding further post-sector change packets for the mobile device until the pre-sector change and the post-sector change packets have been emptied from the class of service queues.

45. The method of claim 1, further comprising:
   generating the buffer in the gateway to temporarily hold the post-sector-change packets; and
   placing the post-sector-change packets in the buffer according to a label that identifies the post-sector-change packets.

* * * * *